3,123,433
PROCESS FOR THE COLOURATION OF FIBRES BASED ON POLYETHYLENE TEREPHTHALATE
Guy Charles Maurice du Peloux, Boisguillaume, and Jean Marie Louis Leroy, Rouen, France, assignors to Compagnie Francaise des Matieres Colorantes, Paris, France, a French company
No Drawing. Filed Feb. 28, 1961, Ser. No. 92,184
Claims priority, application France Mar. 1, 1960
4 Claims. (Cl. 8—41)

The present invention concerns a process for the colouration of fibres based on polyethylene terephthalate.

The development of synthetic fibres which becomes more important every day, the manifold conditions under which they are used and the severe treatments to which the homogeneous fabrics from which they are made or the mixed fabrics in the composition of which they form a part are more and more frequently subjected, make it essential to have available dyestuffs specially adapted to the dyeing or printing of these fibres.

It is known to be relatively easy to dye or print polyester fibres in yellow, orange and red shades possessing very good fastness to the most severe tests, including sublimation, by using mono- or dis-azo dyestuffs derived from pyrazolones, phenols or naphthols containing functions such as COOH, CO—N<, or $SO_2N<$. By using these dyestuffs in admixture with blues, it is possible to obtain on the polyester fibres brown shades which are also very fast. These shades are however difficult to reproduce.

On the other hand, it is known to prepare brown shades on polyester fibres by applying thereto mixtures suitably selected from diazotizable bases and arylides derived from hydroxy carbazole carboxylic acid, then by effecting in only one stage, by treatment with a mixture of acid and nitrite, the diazotization of the base and the coupling. This dyeing process necessitates several operations and it has the additional disadvantage of giving shades whose fastness to sublimation is often inadequate.

Treatments at elevated temperatures, such as permanent pleating, to which fibres based on polyesters are commonly subjected, require the dyestuffs used to be resistant to these temperatures. Their shade and brightness must not vary and, above all, they must not sublime.

It has now been found that it is possible to dye polyester fibres, and especially the ethylene glycol polyterephthalates "Dacron," "Terylene" or "Tergal," in shades ranging from khaki or yellow-brown to violet brown which are fast to wet tests, light and sublimation, by using a dyestuff of one of the general formulae:

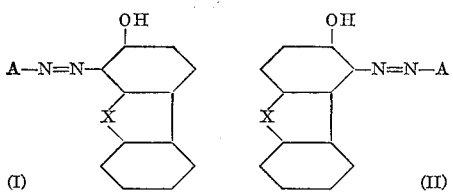

in which X represents an oxygen atom or an NH group and A represents a phenyl or benzene-azobenzene radical possibly substituted by halogen atoms or alkyl, alkoxy, hydroxyalkyl, nitro, CONHR or

groups, R and R′ representing hydrogen atoms or alkyl, hydroxyalkyl, cycloalkyl, aryl or aralkyl groups.

The dyestuffs of Formulae I and II may be prepared by diazotizing a base of the formula A—$NH_2$ in which A has the same significance as above, and coupling the diazo derivative thus obtained with a compound of one of the general formulae:

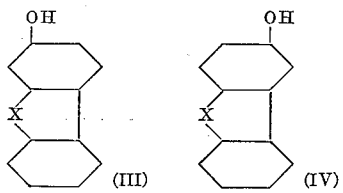

in which X has the same significance as above.

These dyestuffs, previously dispersed, may be used for dyeing polyester fibres either at ordinary pressure in the presence of carriers, or under pressure with or without carriers.

These dyestuffs also find interesting applications to textile materials based on polyester fibres in frame or roller printing or by the Vigoureux process. They may also be used in dyeing by a process which comprises foularding, drying, and then fixing at high temperature.

On the other hand, some of them are also of interest for dyeing and printing of other synthetic fibres such as cellulose triacetate, superpolyamides, and polyvinyl and polyacrylic fibres.

The alkylarylsulphonates and the condensation products of sulphonated aromatic derivatives with aldehydes, especially methylene-dinaphthylsulphonates, form auxiliary products which are particularly valuable for these applications. They enable a good dispersion of the dyestuffs to be obtained and assist their adsorption on the fibres.

The examples below illustrate the present invention without limiting it, the parts therein being by weight unless the contrary is mentioned.

*Example 1*

19.7 parts of 4-aminoazobenzene are kneaded for some hours with 40 parts by volume of 19° Bé. hydrochloric acid and 500 parts of water. The mixture is chilled to 0° C. and diazotised by means of 13.8 parts by volume of a solution containing 50% by weight of sodium nitrite. The diazo derivative thus obtained is introduced into a solution of 18.4 parts of 2-hydroxycarbazole in 500 parts of water and 13 parts by volume of 36° Bé. caustic soda, to which has been added 40 parts of sodium dodecyl benzene sulphonate and 40 parts of sodium carbonate.

After coupling, the dyestuff is isolated by acidifying, filtering and washing and dried in the presence of an auxiliary product possessing dispersing properties such as the sodium salt of dinaphthylmethane disulphonic acid.

100 parts of previously degreased polyester fibres and 3 parts of the above dyestuff are introduced into an apparatus which allows operation under pressure, and dyeing is carried out for an hour at 130–135° C. at a pressure of about 2 kg./$cm.^2$. The fibres are then treated in the hot in an alkaline reducing bath containing 1 to 2 g. per litre of octyl phenol/ethylene oxide condensate.

The dyestuff possesses an excellent affinity for the polyester fibres, which are dyed a yellow-brown shade having excellent general fastness.

The following table illustrates eleven examples analogous to Example 1:

| Example | Diazotized base | Coupling compound used | Shade obtained on polyester fibres |
|---|---|---|---|
| 2 | 4-amino-azobenzene | 2-hydroxy-diphenylene-oxide. | Brown orange. |
| 3 | 4-amino-3,2'-dimethyl-azobenzene. | do | Yellow brown. |
| 4 | 4-amino-4'-nitro-azobenzene. | do | Do. |
| 5 | 4-amino-3,6,4'-trimethoxy-azobenzene. | do | Violet brown. |
| 6 | 4-amino-4'-methoxy-3,6-diethoxy-azobenzene. | do | Do. |
| 7 | 4-amino-3,2'-dimethyl-azobenzene. | 2-hydroxy-carbazole | Yellow brown. |
| 8 | 4-amino-4'-nitro-azobenzene. | do | Red brown. |
| 9 | 4-amino-3,6,4'-trimethoxy-azobenzene. | do | Brown. |
| 10 | 4-amino-4'-methoxy-3,6-diethoxy-azobenzene. | do | Do. |
| 11 | 2-methoxy-4-amino-azobenzene. | 3-hydroxy-diphenylene-oxide. | Brownish orange. |
| 12 | 2-methoxy-4'-ethoxy-4-amino-azobenzene. | do | Reddish brown. |

*Example 13*

A printing paste is prepared consisting of the following parts:

| | Parts |
|---|---|
| Dyestuff of Example 1 | 6 |
| Sodium methylene-dinaphthylsulphonate | 14 |
| Monoethyl ether of ethylene glycol | 50 |
| Water | 300 |
| Aqueous solution of sodium chlorate containing 300 g. per litre | 30 |
| Industrial gum | 600 |

This paste is applied on a grooved roller to a fabric of polyester fibres previously desized by treatment at 75° C. for 15 minutes with a 1 g./litre solution of sodium carbonate. The colour is fixed by steaming under pressure at 130–140° C. The fabric is rinsed and treated in the hot by means of an alkaline reducing bath containing 1 to 2 g. per litre of an octylphenol/ethylene oxide condensate.

The fabric is dyed a brown shade having excellent fastness, the reserved parts being perfectly white.

*Example 14*

25 parts of 4-N-diethylsulphonamido-2-amino-anisole are made into a paste in 25 parts by volume of 19° Bé. hydrochloric acid and diazotized under conditions identical with those indicated in Example 1. After filtration, the solution of the diazo compound is introduced into a bath of 2-hydroxy-diphenylene-oxide prepared in the same way as the bath of 2-hydroxycarbazole in Example 1.

The dyestuff obtained dyes polyester fibres a brown orange shade fast to light, wet tests and sublimation.

On replacing 2-hydroxy-diphenylene-oxide by 2-hydroxycarbazole, a khaki shade is obtained.

We claim:
1. Process for the colouration of fibres based on polyethylene terephthalate which comprises applying thereto a dyestuff of the general formula:

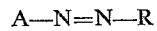

in which A represents a member selected from the group consisting of the phenyl radical, the 4-benzene-azophenyl radical, the methyl substituted phenyl radicals, the methoxy substitued phenyl radicals, the ethoxy substituted phenyl radicals, the nitro substituted phenyl radicals, the N-dimethylsulphonamido substituted phenyl radicals, the N-diethylsulphonamido substituted phenyl radicals, the methyl substituted 4-benzene-azo-phenyl radicals, the methoxy substituted 4-benzene-azo-phenyl radicals, the ethoxy substituted 4-benzene-azo-phenyl radicals, the nitro substituted 4-benzene-azo-phenyl radicals and R represents the residue of a member selected from the group consisting of 2-hydroxy-carbazole of the formula:

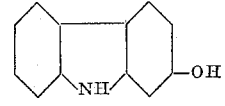

and 2-hydroxy-diphenyleneoxide of the formula:

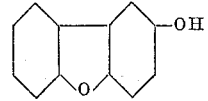

2. Process as claimed in claim 1 in which the dyestuff is applied to the fibres by dyeing under superatmospheric pressure.
3. Process as claimed in claim 1 in which the dyestuff is applied to the fibres by dyeing at atmospheric pressure in the presence of a carrier.
4. Process as claimed in claim 1 in which the dyestuff is applied to the fibres by means of a printing paste and fixed by steaming under superatmospheric pressure.

References Cited in the file of this patent
UNITED STATES PATENTS

| 2,014,484 | Strusser | Sept. 17, 1935 |
| 2,128,508 | Strusser | Aug. 30, 1938 |
| 2,138,553 | Muth | Nov. 29, 1938 |
| 2,557,285 | Heywood et al. | June 19, 1951 |
| 2,934,397 | Landerl | Apr. 26, 1960 |
| 2,955,901 | Kruckenberg | Oct. 11, 1960 |
| 3,012,843 | Gangneux et al. | Dec. 12, 1961 |

FOREIGN PATENTS

| 395,026 | Great Britain | July 10, 1953 |

OTHER REFERENCES

Gilman et al.: "J. Am. Chem. Soc.," vol. 61, pp. 3146–3148 (1939). (Copy in Pat. Off. Sci. Lib.)

Gilman et al.: "J. Am. Chem. Soc.," vol. 68, pp. 426–428. (Copy in Pat. Off. Sci. Lib.)